Feb. 5, 1946.  K. MAHNKE  2,393,998
ALTERNATING CURRENT WINCH DRIVE
Filed March 11, 1944  2 Sheets-Sheet 1

WITNESSES:  
E. A. M'Closkey  
Cunt M. Avery

INVENTOR  
Kurt Mahnke.  
BY  
Paul E. Fiegemann  
ATTORNEY

Patented Feb. 5, 1946

2,393,998

UNITED STATES PATENT OFFICE 2,393,998

ALTERNATING CURRENT WINCH DRIVE

Kurt Mahnke, Forest Hills, Pa., assignor to Westinghouse Electric Corporation, East Pittsburgh, Pa., a corporation of Pennsylvania Application March 11, 1944, Serial No. 526,011

10 Claims. (Cl. 172—152)

My invention relates to electric winch drives and, in particular, to a control system for such drives operating with an alternating-current multi-speed motor.

It is an object of the invention to provide a winch control system which affords a flexible and smooth-operating control of a multi-speed type alternating-current motor so as to take full advantage of the large speed range obtainable with such motors and a switching over between field connections of different speed torque characteristics or even different power ratings without incurring disturbing transitory effects.

Another object of my invention is to provide the multi-speed motor in such a system with a field winding and pole arrangement especially adapted for high-speed operation under no-load or light-load conditions, while preventing the energizing connections of the motor to be transferred to this arrangement if the load exceeds a given value.

A further object of the invention is to devise a control system for multi-speed alternating-current drives which permits an automatically controlled acceleration as well as an automatically controlled deceleration, and in which both control effects are obtained by means of the same timing relay or the same group of timing relays.

Still another object of the invention aims at providing a control system of the type referred to which permits a quick reversal of the motor under control of automatic devices that provide a timed interval between the deenergization of a previously operative line contactor and the energization of a reversing line contactor, while applying a brake during this interval so as to stop or nearly stop the winch drive before the motor is energized for reverse rotation; and it is a correlated object to obtain the just-mentioned control effect with the aid of one or several of the acceleration and deceleration controlling timing relays before mentioned.

Figure 1:
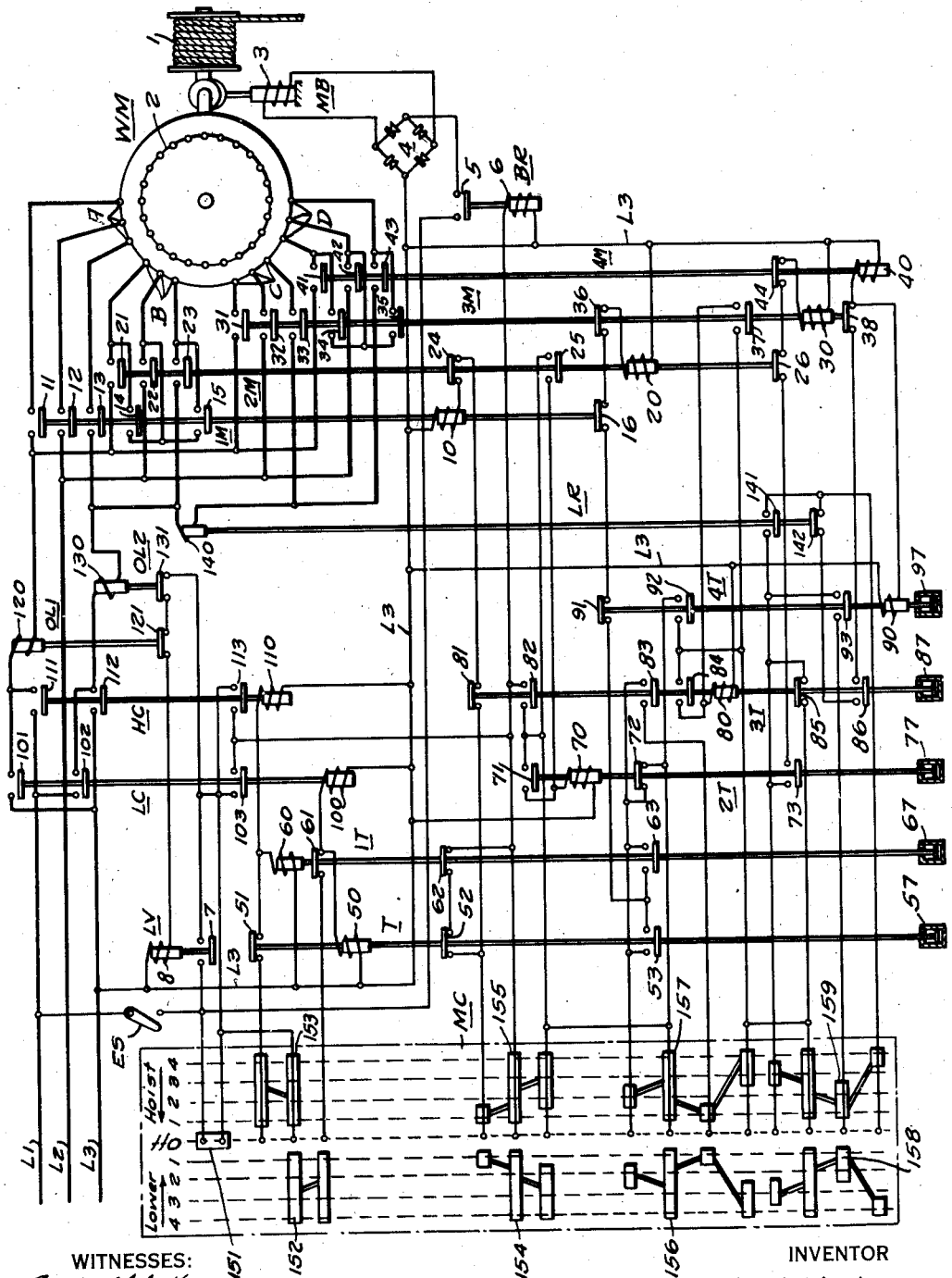
Figure 2:
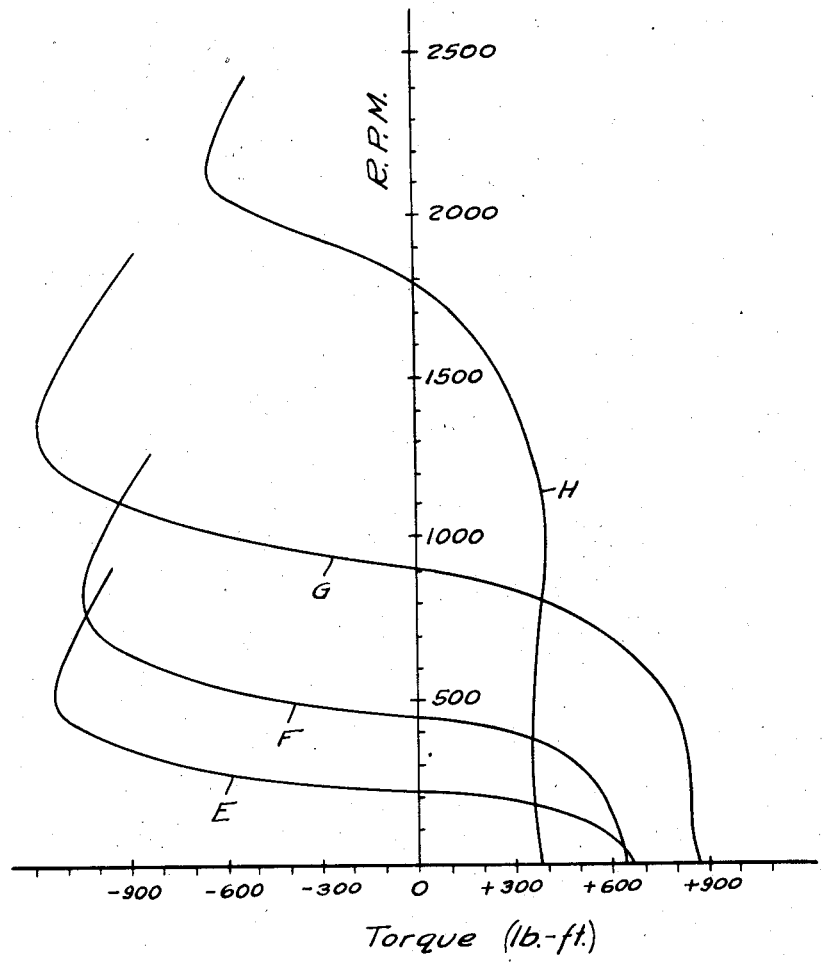

These and other objects and advantages as well as the means for achieving them in accordance with this invention will be understood from the following description of the embodiment shown in the drawings, in which Figure 1 represents the circuit diagram of a complete winch control system, while Fig. 2 is an explanatory diagram exemplifying four different speed-torque characteristics of the multispeed winch motor.

Referring to Fig. 1, the winch drum 1 of the system has its shaft connected with the armature 2 of a winch motor WM. This motor is an alternating-current induction motor with a squirrel-cage armature. The stator is provided with two groups of field windings, each of which is subdivided and arranged for operating the motor with two numbers of poles. One of the groups of windings is provided with terminal groups A and B for operation with 32 and 16 poles. The second group of field windings is connected to the terminal groups C and D for operation with eight and four poles. Consequently, the motor has four different synchronous speeds of which that related to terminal A is the lowest, while the others are higher according to the ratio 1:2:4:8. Motors of this type are generally known and hence not part of the invention proper.

The winch shaft connecting the motor armature 2 with the winch drum 1 is provided with a friction brake MB. This brake is spring biased and provided with a release magnet 3 so as to be operative as long as the magnet 3 is not energized. The magnet is connected with rectifiers 4 under control by the contact 5 of a brake relay BR whose energizing coil is denoted by 6.

The energization of the winch motor WM and the current supply for the appertaining control system are derived from an alternating three-phase current line. Two of the three mains L1, L2, and L3 of the line are connected to the control system through an emergency switch ES and a master controller MC. The switch ES must be closed in order to energize the control system. The current supply to the system extends further through the contact 7 of a low-voltage relay LV whose control coil 8 closes this contact only as long as the line voltage stays above a given minimum value.

Four field contactors 1M, 2M, 3M, and 4M are provided for connecting the respective terminal groups A, B, C, and D to the line and for controlling the necessary other connections required for operating the motor at the speed appertaining to the terminal group to be energized. The contactor 1M has five main contacts, numbered 11 through 15, which serve the just-mentioned purpose, and an interlock contact 16, all controlled by the relay coil 10. The contactor 2M has three main contacts 21, 22, 23 and three interlock contacts 24, 25, and 26. The interlock contact 24 is series connected with the coil 10 of contactor 1M so that the latter can be energized only when the contactor 2M is deenergized. Contactor 3M has five main contacts 31 through 35 and three interlock contacts 36, 37, and 38. Contact 36 is series connected with coil 20 of contactor 2M so that the latter can be energized only when contactor 3M is inoperative. The contactor 4M appertaining to the terminal group D for highest motor speed has main contacts 41, 42, 43, and an interlock contact 44 which is series connected with coil 30 of contactor 3M so that the latter remains inoperative when contactor 4M is energized. Similarly, the interlock contact 38 of contactor 3M prevents the coil 40 of contactor 4M from being energized as long as contactor 3M is operative.

A group of timing relays denoted by T, 1T, 2T, 3T, and 4T are connected with the field contactors 1M, 2M, 3M, and 4M as well as with the master controller MC in order to provide given intervals of time between the sequential energization of the field contactors and serve also for performing an automatic acceleration, deceleration, and reversal of the winch motor under conditions to be described in a later place.

The control coil 50 of timing relay T actuates contacts 51, 52, and 53 under control by a timing device 57. The control coil 60 of timing relay 1T operates contacts 61, 62, and 63 under control by a timing device 67. Similarly, the timing relays 2T, 3T and 4T have operating coils 70, 80, 90, respectively, for operating contacts 71, 72, 73 and 81 through 86 and 91, 92, 93, respectively; the appertaining timing devices are denoted by 77, 87, and 97, respectively. The timing relays T, T1, T2, T3, and T4 differ from those customarily employed in motor control systems in having a retarded pickup as well as a retarded dropout. The timing devices 57, 67, 77, 87, and 97 are designed in accordance with this requirement. While these devices are illustrated as being of the dashpot type, it will be understood that other retarding means operative in both directions of operation can be used instead. For instance, double acting timing devices containing an escapement mechanism or flywheel or rotating baffle vane, all of these types being known as such, may be applied for the purpose of the invention.

The control system is further provided with a load responsive relay LR whose control coil 140 actuates two contacts 141 and 142. Coil 140 is series connected with the alternating-current line at such a point that it is energized only when one or both of the terminal groups C and D are energized and is rated for operating the contacts 141 and 142 only when this load current exceeds a given low value. The purpose of this relay LR is to prevent a transfer of the field connections from contactor 3M and terminal group C to contactor 4M and terminal group D unless the motor is operated under no-load or light load conditions.

Two reversing line contactors LC and HC, each having a control coil 100 or 110, two main contacts 101, 102 or 111, 112, and an interlock contact 103 or 113 serve to energize the motor for operation in one or the other direction. Two further contactors, denoted by OL1 and OL2 provide locked rotor protection. They have their respective coils 120 and 130 series connected between the line contactors and the field contactors, while their respective contacts 121 and 131 are series connected with the control coil 8 of the low-voltage relay LV in order to deenergize the latter when the current coil 120 or 130 responds to excess load conditions.

The master controller MC has an "off" position, four sequential positions for controlling the hoisting operation of the motor, and four sequential positions for controlling the lowering operation. The stationary contact fingers of the master controller cooperate with a contact segment 151 and with several groups of interconnected segments, these groups being denoted by numerals 152 through 159, respectively.

The above described controller system operates in the following manner:

*Slow acceleration*

In the "off" position of the master controller MC and with the emergency switch ES closed, coil 8 of the low-voltage relay LV is energized in circuit L3, 8, 121, 131, 151, ES, L1 and closes its contact 7, thereby shunting the segment 151 of the master controller MC. As a result, the low-voltage relay remains energized when the master controller is moved out of its "off" position and becomes deenergized only when either the emergency switch ES is opened, or the line voltage fails, or when one of the protective relays OL1 or OL2 opens its contact 121 or 131 in response to overload conditions. After any such release of relay LV, the master controller has to be returned to its "off" position in order to reset the system. Assuming the low-voltage relay LV to remain energized, a slow acceleration of the winch drive is obtained as follows.

When moving the master controller from "off" to first point hoist, line contactor HC becomes energized through circuit L3, 110, 51, 153, 7, ES, L1 and, by closing its contacts 111 and 112, connects the winch motor WM to the line for operation in the hoisting direction. Contact 113 of contactor HC closes and energizes the brake relay BR through L3, 6, 113, 7, ES, L1 which, in turn, closes contact 5 and energizes coil 3 of brake MB through rectifier 4, thereby releasing the brake. At the same time, the field contactor 1M is energized through segment group 155 of MC in circuit L3, 10, 24, 81, 155, 113, 7, ES, L1 and, by closing its contacts 11, 12 and 13, attaches the line to the 32-pole connections of the motor. As a result, the motor is energized for slow speed hoisting. The timing relay 1T becomes energized through L3, 60, 51, 153, 7, ES, L1 but actuates its contacts only after the elapse of its timing period. Then, contact 63 of 1T is closed in order to prepare an energizing circuit for coil 20 of field contactor 2M.

On second point hoist and after the timing relay 1T has picked up, the master controller, at segment group 155, deenergizes coil 10 of contactor 1M and, at segment group 157, closes the energizing circuit of contactor 2M through L3, 20, 35, 16, 91, 63, 157, 155, 113, 7, ES, L1. As a result, contacts 21, 22 and 23 connect the line to the 16-pole terminal group B of the winch motor WM. Interlock contacts 24 and 26 of contactor 2M open while contact 25 closes in order to energize the timing relay 2T via L3, 70, 25, 155, 113, 7, ES, L1. Upon elapse of its timing period, relay 2T actuates its contacts and, at 73, prepares contactor 3M for operation.

On third point hoist, after timing relay 2T has picked up, contactor 2M drops out because the circuit of its coil 20 is opened at 72 and 157, and contactor 3M is energized in circuit L3, 30, 44, 26, 73, 159, 157, 155, 113, 7, ES, L1 thereby energizing the 8-pole connections of the winch motor WM at 31, 32 and 33. Contacts 34 and 35 close also but remain ineffective as long as contactor 4M remains deenergized. Interlock contacts 36 and 38 of 3M open, while contact 37 energizes the timing relay 3T by closing the circuit L3, 80, 37, 157, 155, 113, 7, ES, L1. After elapse of its timing period, relay 3T actuates its contacts. When transferring the motor connection from contactor 2M to 3M, the coil 140 of load relay LR becomes energized so that LR closes contact 141 and opens contact 142. If the load is light, LR drops out again after the motor current has decreased sufficiently, so that the original positions of contacts 141 and 142 are restored.

On fourth point hoist, after timing relay 3T has picked up and after load relay LR has dropped out again, contactor 3M is deenergized, because the circuit of its coil 30 is interrupted at 85, 153 and 141, and contactor 4M is energized through L3, 40, 38, 86, 142, 159, 157, 113, 7, ES, L1 so that contacts 41, 42 and 43 are closed and connect the 4-pole terminals D of motor WM to the line. Contact 38 of contactor 3M connects coil 90 of timing relay 4T in parallel to coil 40 of contactor 4M so that the timing relay 4T, upon elapse of its timing period, opens contact 91 and closes contacts 92 and 93. If the load current on third point hoist is too heavy so that the load relay LR remains operative when switching the master controller to fourth point hoist, contactor 3M does not drop out because its coil 30 remains energized due to the closure of load relay contact 141, and contactor 4M and timing relay 4T cannot come in because the circuits of the coils 40 and 90, respectively, remain interrupted at contact 38 of contactor 3M. Consequently, the transfer of the motor connections to the highest speed characteristic is automatically controlled by the load relay LR and takes place only if both the master controller and the load relay are in proper operating position. Thus, the control system permits an operation at highest speeds only for zero or light loads.

*Fast acceleration*

For fast acceleration in the hoisting direction, the master controller MC is thrown rapidly from "off" to fourth point hoist. Contactors HC and 1M pick up immediately and connect the 32-pole terminals to the line for lowest motor speed; the brake relay BR releases the brake MB, and the timing relay 1T is energized as described in the foregoing when referring to slow acceleration at first point hoist. However, as soon as the timing period of relay 1T elapses, contactor 1M is tripped and contactor 2M energized, thereby transferring the line connection to the 16-pole terminal B of the motor for increasing the motor speed. Contactor 2M energizes the timing relay 2T which, after its timed delay, disconnects contactor 2M thereby energizing contactor 3M and connecting the 8-pole terminal group C to the line. Contactor 3M energizes relay 3T which, after its timing period, actuates its contacts and thus energizes 4M and 4T in order to operate the motor at 4-pole speed, provided the motor load is light enough to keep the load relay LR inactive. At higher loads, relays 4M and 4T will not come in and the motor remains connected for 8-pole speed as described previously.

In this manner, the motor, when set for maximum acceleration, is controlled automatically in accordance with the time setting of the timing relays.

*Slow deceleration*

Assuming the motor to be operating at top speed in the hoisting direction, the return of the master controller from fourth to third point hoist has the effect of tripping the contactor 4M by interrupting the circuit of its coil 40 at segment group 159. As a result, the 4-pole terminal group C is disconnected by contacts 41, 42, 43 and contactor 3M is energized by the closure of interlock contact 44 thereby transferring, at contacts 31, 32, 33, the line connections to the 8-pole terminal group C of the motor. Timing relay 4T is tripped at 159 and 38 and drops out after elapse of its timing interval.

In a similar manner, turning the master controller from third to second point hoist causes tripping of contactor 3M which in turn energizes contactor 2M so as to transfer the line connection to the 16-pole terminal group B of the motor. At the same time, relay 3T is deenergized and drops out after its timed delay.

Returning the master controller to first point hoist has the effect of tripping the contactor 2M and subsequently energizing the contactor 1M for transferring the line connection to the 32-pole terminals A. Likewise timing relay 2T is caused to drop out after its timing interval.

When going from first point hoist to "off," contactors 1M and HC are disconnected and thus the motor WM deenergized. The relay BR is also deenergized and releases the brake MB for operation. Upon elapse of its timing period, relay 1T drops out.

*Fast deceleration from high to low speed*

The maximum degree of deceleration from highest to lowest hoisting speed is obtained by throwing the handle of the master controller MC rapidly from fourth point hoist to first point hoist. Contactor 4M will then drop out immediately while contactor 3M is picked up, transferring the motor from highest (4-pole) speed to 8-pole speed. After elapse of its interval, relay 4T trips contactor 3M which, in turn, energizes contactor 2M thus transferring the motor to 16-pole speed and tripping relay 3T. A timed interval later, relay 3T trips 2M and picks up 1M so that the motor is switched over to slowest (32-pole) speed and relay 2T caused to drop out upon elapse of its timing period. In this manner the maximum degree of deceleration is controlled by the same time relays that are also effective for controlling the available maximum acceleration of the motor.

*Fast stopping*

The motor can be stopped within minimum time by throwing the master control handle from any operative position back to the "off" position. In each case, all energized timing relays are virtually immediately disconnected, the main line contactor HC (or LC) is tripped and the brake MB set for stopping the motor. For instance, when throwing the master controller from fourth point hoist to "off," field contactor 4M and line contactor HC are tripped, the latter closing its contact 113 so as to energize the brake relay BR. All timing relays 4T, 3T, 2T and 1T are immediately disconnected by MC and hence will start their timing period concurrently. Hence, the timing relays will all drop out within minimum time.

A suitable timing period for the timing relays in both operating directions is approximately one second. However, in order to permit a proper reacceleration immediately after stopping, the periods of the relays should be graduated, relay 4T having less delay than 3T, 3T less delay than 2T and 2T less delay than 1T (or T).

*Lowering operation*

In order to simplify the explanation, the foregoing description referred to hoisting operations only. However, the operation is similar for lowering performance.

When moving the master controller from "off" to first point lowering, the line contactor HC becomes energized through L3, 100, 61, 152, 113, 7, ES, L1 and, by closing contacts 101 and 102, connects the motor connections to the line for operation in the lowering direction. Contact 103 of line contactor LC energizes the brake relay BR thereof releasing the brake MB. Simultaneously, the field contactor 1M is energized through segment group 154 of MC in circuit L3, 10, 24, 81, 154, 113, 7, ES, L1 and connects the 32-pole terminal group A of motor WM to the line for slow speed lowering. The timing relay T comes in through L3, 50, 61, 152, 113, 7, ES, L1 and, upon elapse of its timing period, closes contact 53 in order to prepare an energizing circuit for coil 20 of contactor 2M.

The connections thus controlled on first step lowering are similar to those obtaining on first step hoist except that contactor LR has taken the place of HC in order to reverse the running direction of the motor, and that the timing relay T has taken the place of relay 1T in order to take care of the overhauling characteristic of the induction motor. Aside from the substitution of LC for HC, the connections on second, third, and fourth point lowering are similar to those on the corresponding points hoist. This will be readily recognized from the fact that in the master controller MC the segment groups 154, 156 and 158 for lowering are symmetrical to the respective segment groups 155, 157 and 159 for hoisting. Consequently, the motor operation when lowering is similar to the above-described hoisting operations as regards slow and fast acceleration, slow and fast deceleration, and fast stopping.

Fast reversal of direction

In order to reverse the direction of operation at maximum speed, the master controller may be thrown from any point hoist to any point lowering or vice versa without stopping it in the "off" position. In any such operation, the timing of relay 1T or T provides automatically an interval in which the motor is deenergized and fully or nearly stopped by the brake before it is accelerated in the opposite direction. For instance, when throwing the master controller from fourth point hoist to fourth point lowering, the motor is first stopped as described above under the heading "Fast stopping." The timing relay 1T, having a longer timing period than relays 2T, 3T and 4T, then determines an interval in which the contactor HC is deenergized and the brake MB operative to slow down or fully stop the motor and in which the reversing line contactor LC cannot as yet be closed because the circuit of its coil 100 remains open at contact 61 of relay 1T. Hence, only after the elapse of the timing period of 1T is contactor LC energized and the relay BR caused to release the brake MB. This braking interval is preferably chosen in relation to the average deceleration characteristic of the motor and brake, so that the speed will drop below a satisfactory value before the reverse energization becomes effective. From then on, an automatic acceleration in the lowering direction will take place substantially as described above under the heading "Fast acceleration" with relay T taking the place of relay 1T.

Locked rotor protection

The overload relays OL1 and OL2 provide protection from locked rotor condition. The overload occurring due to locking of the rotor will trip one or both of these relays and release the holding circuit of the relay LV, thereby disconnecting the control network, at contact 7, from the line so that the motor is deenergized and the brake set. As described previously, the relays LV, OL1 and OL2 are reset for operation by returning the master controller to the "off" position. The relays OL1 and OL2 are preferably of the same type as the customary overload relays, that is, they may have a reset magnet which is energized in the "off" position by a reset contact of the master controller and the relay LV may be provided with a break contact so as to disconnect the reset magnets when relay LV picks up (not shown).

Example of speed-torque characteristics

For further elucidating a system according to the invention, a set of approximate sped torque characteristics for a hoisting operation is represented in Fig. 2. These characteristics refer to a four-speed winch drive as described in the foregoing which is designed for a three-phase line voltage of 440 volts and 60 cycles and a squirrel cage motor having two three-phase sets of stator windings subdivided for 32, 16 and 8, 4 poles respectively with about 50 H. P. at 4 poles, about 50 H. P. at 8 poles, about 25 H. P. at 16 poles, and about 12.5 H. P. at 32 poles for synchronous speeds of 1800, 900, 450 and 225 R. P. M. respectively.

Curve E of Fig. 2 represents diagrammatically a characteristic for slow speed operation (32 poles, 12.5 H. P.) as obtained on first point hoist. Curve F is characteristic of a 16-pole (25 H. P.) operation as obtained on second point hoist. Curve G refers to 8-pole (50 H. P.) operation on third point hoist, and curve H to 4-pole (50 H. P.) operation at highest speed on fourth point hoist. As explained, the load relay LR prevents the system from passing from an operation according to characteristic G to the high speed-light load operation according to curve H unless the current in the stator windings has died down to a sufficiently low value.

Summary

As set forth in the foregoing, a winch or hoist control system according to the invention provides a speed control within wide limits with the aid of a multi-speed alternating-current motor in combination with a master controller and a set of timing relays that permit a manual control for acceleration and deceleration at a selectable rate of change as well as an automatic control for both acceleration and deceleration at a timed rate of speed change. In the illustrated embodiment in accordance with one feature of my invention, this automatic control is achieved by timing relays which have a timed retarded operation when picking up as well as when dropping out, so that one and the same relay or group of relays takes care of both the acceleration or deceleration control.

As further explained in the foregoing, the field winding connections for operation of the motor at highest speed can be so chosen as to best suit the requirements of no-load or light load operation, while the provision of a special load relay prevents the control system from switching the motor over to these high-speed connections if the load is unsuitable for such operation. It will also be understood from the foregoing description that in accordance with another feature of my invention, the acceleration and deceleration controlling time relays or one of them has also the function of providing a given interval in which the motor is deenergized and the friction brake effective in order to stop or greatly retard the winch drive before a reversing energization can be applied, and it will also be seen that this function is effective and especially favorable for an automatic high-speed reversal of the hoisting direction.

It will be obvious to those skilled in the art that a system according to the invention can be modified in various respects, especially as regards the details or number of control devices used in the system, without departing from the objects, advantages, and essential features of the invention. Therefore, I wish this specification to be understood as illustrative and not in a limiting sense.

I claim as my invention:

1. A winch control system comprising a winch drum, a multi-speed alternating-current motor therefor having a plurality of selectively operable field terminal groups for correspondingly different operating speeds, circuit means for supplying energy to said motor, plurality of relay means for connecting said circuit means to said terminal groups respectively, an operator-actuated master controller connected with said relay means for actuating them so as to sequentially energize said terminal groups for progressively changing the speed of said motor, and a load responsive relay having a coil connected between said circuit means and said relay means appertaining to the terminal group for highest motor speed and having a contact disposed between said latter relay means and said master controller so as to prevent said latter relay means from energizing said latter terminal group when the motor load exceeds a given value.

2. A winch control system comprising a winch drum, a multi-speed alternating-current motor therefor having a plurality of selectively operable field terminal groups for correspondingly different operating speeds, a source of energy for said motor, a plurality of contactors for connecting said source to said terminal groups respectively, a master controller for energizing said contactors sequentially in order to progressively change the motor speed, and a load responsive relay having a control coil disposed between one of said contactors and said source so as to be actuated in dependence upon the motor load passing through a given limit condition when said latter contactor is operative, said relay having contacts connected with said master controller and said latter contactor for preventing said contactor from being deenergized when said master controller is moved in the direction in which the departure of the load from said load condition would be increased.

3. A winch control system comprising a winch drum, a multi-speed alternating-current motor therefor having a plurality of selectively operable field terminal groups for correspondingly different operating speeds, a source of energy for said motor, a plurality of contactors for connecting said source to said terminal groups respectively, a master controller for energizing said contactors sequentially in order to progressively change the motor speed, and a load responsive relay having a control coil disposed between one of said contactors and said source so as to be actuated in dependence upon the motor load passing through a given limit condition when said latter contactor is operative, said relay having contacts connected with said master controller and disposed relative to said one contactor and a sequentially adjacent second contactor so as to prevent said one contactor from being deenergized and said second contactor from being energized when said master controller is moved in the direction in which the departure of the load from said load condition would be increased.

4. A winch control system comprising a winch drum, a multi-speed alternating-current motor therefor having a plurality of selectively operable field terminal groups for correspondingly different operating speeds, a source of energy for said motor, a plurality of contactors for connecting said source to said terminal groups respectively, a master controller for energizing said contactors sequentially in order to progressively change the motor speed, and a load responsive relay having a control coil disposed between one of said contactors and said source so as to be actuated when the load of said motor exceeds a given value while said one contactor is operative, and circuit means under control by said relay and said master controller for preventing said one contactor from disconnecting the appertaining terminal groups while preventing the contactor for the next higher motor speed from connecting its appertaining terminal group to said source.

5. A winch control system comprising a winch drum, a multi-speed alternating-current motor therefor having a plurality of selectively operable field terminal groups for correspondingly different operating speeds, a source of energy for said motor, two main contactors disposed between said source and said motor for energizing said motor to run in one or the other direction, respectively, a plurality of field contactors disposed between said main contactors and said terminal groups, a master controller having an "off" position and two series of operative positions on opposite sides respectively of said "off" position, said master controller having contact means for actuating said main contactors in said series of positions respectively and further contact means for actuating, within each of said series, said field contactors so as to sequentially energize said terminal groups for progressively changing the speed of said motor, a friction brake disposed for retarding said drum and connected with said master controller so as to be effective when said controller is in said "off" position, and timing means operative when said master controller is moved from an operative position through said "off" position into a reverse operative position and controlling said main contactors and brake so as to prevent the reversed energization of said motor and the release of said brake during a given timing interval.

6. A winch control system comprising a winch drum, a multi-speed alternating current motor therefor having a plurality of selectively operable field terminal groups for correspondingly different operating speeds, a source of energy for said motor, contactor means disposed between said source and said motor for energizing said motor to run in one or the other direction, respectively, operator-controlled selective switch means disposed for controlling said contactor means and connected with said terminal groups for energizing them sequentially so as to progressively change the speed of said motor, a friction brake for said drum, and a timing relay for controlling said friction brake and said contactor means so as to maintain said brake operative and prevent a reversed energization of said motor for a given timing interval when said switch means are moved from an operative position to a motor reversing other operative position.

7. A hoist control system comprising a cable drum, a motor therefor, an appertaining friction brake, circuit means for operating said motor in both directions with different speed torque characteristics, control means including a multi-position master controller for sequentially controlling said circuit means and brake, said timing means associated with said control means and master controller for superimposing an automatic control on said circuit means and brake so as to maintain said brake operative while preventing a reversed energization of said motor for a given timing period when said master controller is thrown from one position to a motor reversing other position.

8. A winch control system comprising a winch drum, a multi-speed alternating-current motor therefor having a plurality of selectively operable field terminal groups for correspondingly different operating speeds, a source of energy for said motor, a plurality of contactors for connecting said source to said terminal groups respectively, an operator-actuated master controller for actuating said contactors so as to sequentially energize said terminal groups for progressively changing the speed of said motor, and timing relays connected with said contactors so as to provide a timed minimum interval between the actuation of one contactor and that of the next contactor, said timing relays having timing means operative upon energization and deenergization of the appertaining time relay to produce a timing effect during both accelerating and deccelerating actuation of said master controller.

9. A winch control system comprising a winch drum, a multi-speed alternating-current motor therefor having a plurality of selectively operable field terminal groups for correspondingly different operating speeds, a source of energy for said motor, a plurality of contactors for connecting said source to said terminal groups respectively, an operator-actuated master controller for actuating said contactors so as to sequentially energize said terminal groups for progressively changing the speed of said motor, and timing relays connected with said contactors so as to provide a timed minimum interval between the actuation of one contactor and that of the next contactor, said timing relays having timing means operative upon energization and deenergization of the appertaining time relay to produce a timing effect during both accelerating and decelerating actuation of said master controller, said timing relays being under control by said master controller so as to become deenergized when said master controller is thrown from an operative position to its inoperative position, and an electrically releasable friction brake disposed for retarding said drum and controlled by one of said timing relays and said master controller so as to operate during the timing period of said timing relay after said master controller has reached the inoperative position.

10. A winch control system comprising a winch drum, a multi-speed alternating-current motor therefor having a plurality of selectively operable field terminal groups for correspondingly different operating speeds, a source of energy for said motor, a plurality of contactors for connecting said source to said terminal groups respectively, an operator-actuated master controller for actuating said contactors so as to sequentially energize said terminal groups for progressively changing the speed of said motor, a timing relay provided for each of said contactors so as to determine a timed minimum interval between the actuation of one contactor and that of the sequentially next contactor, an energizing circuit for each of said timing relays extending through said master controller so that, when said master controller is actuated in one direction, said timing relays are sequentially energized previous to the respective contactors, said timing relays being disposed so as to be operative during the decelerating actuation of said master controller and having graduated timing periods, the period of the last deenergized timing relay being the largest, and a brake disposed for retarding said drum and controlled by said latter timing relay so as to be operative during the timing period of said relay when the latter is deenergized in order to brake the motor speed during said period before the motor can be reversed.

KURT MAHNKE.